United States Patent [19]
Tomisawa

[11] Patent Number: 5,182,710
[45] Date of Patent: Jan. 26, 1993

[54] DRIVING CONDITION RECOGNITION SYSTEM FOR AN AUTOMOTIVE VEHICLE AND SHIFT CONTROL SYSTEM FOR AN AUTOMOTIVE AUTOMATIC POWER TRANSMISSION UTILIZING THE RESULTS OF VEHICULAR DRIVING STATE RECOGNITION

[75] Inventor: Naoki Tomisawa, Isezaki, Japan

[73] Assignee: Japan Electronic Control Systems Co. Ltd., Gunma, Japan

[21] Appl. No.: 504,183

[22] Filed: Apr. 4, 1990

[30] Foreign Application Priority Data

Apr. 4, 1989 [JP] Japan ................................. 1-83901

[51] Int. Cl.$^5$ ............................................ B60K 41/18
[52] U.S. Cl. ................................... 364/424.1; 74/866
[58] Field of Search ..................... 364/424.1, 424.05; 434/71; 73/105; 123/478; 74/866

[56] References Cited

U.S. PATENT DOCUMENTS

| | | | |
|---|---|---|---|
| 4,439,158 | 2/1984 | Weber | 434/71 |
| 4,523,281 | 6/1985 | Noda et al. | 364/424.1 |
| 4,622,637 | 11/1986 | Tomita et al. | 364/424.1 |
| 4,889,015 | 12/1989 | Kondo | 364/424.1 |

Primary Examiner—Salvatore Cangialosi

[57] ABSTRACT

A driving condition recognition system includes data sampling means, respectively monitoring a plurality of preselected parameters associated with vehicular driving, such as a throttle valve open angle, and engine speed and so forth, for sampling vehicular drive condition associated parameter data within every predetermined period of time. The system also includes means for deriving a vehicle condition evaluating data on the basis of all of the sampled parameter data with respect to each of parameters to be monitored. The system further includes means for evaluating respective an evaluating function set with respect to each parameter for determining satisfying degree relative to the relevent evaluating function. The system further includes means for recognizing vehicle driving condition on the basis of satisfying degree of respective parameters.

21 Claims, 4 Drawing Sheets

FIG. 4

| | FUNCTION | | | |
|---|---|---|---|---|
| | HEAVY TRAFFIC(F1) | TOWN ROAD(F2) | HIGH SPEED CRUISE(F3) | SPORTS (F4) |
| TVO | S | M | M | L |
| $\Delta TVO/\Delta t$ | S | M | S | L |
| N | S | S~M | M | M~L |
| $\Delta N/\Delta t$ | S | M | M | L |
| VSP | S | S~M | L | M |
| $\Delta VSP/\Delta t$ | S | M | M | L |
| SPEED RATIO | L | L~M | H | L~M |
| SHIFT FREQUENCY | M | M | S | L |

DRIVING CONDITION RECOGNITION SYSTEM FOR AN AUTOMOTIVE VEHICLE AND SHIFT CONTROL SYSTEM FOR AN AUTOMOTIVE AUTOMATIC POWER TRANSMISSION UTILIZING THE RESULTS OF VEHICULAR DRIVING STATE RECOGNITION

BACKGROUND OF THE INVENTION

1. Field of the Invention

The present invention relates generally to a system for recognizing driving condition of an automotive vehicle. The invention also relates to a shift control system for selecting the transmission speed ratio of an automatic power transmission utilizing the recognized vehicle driving condition.

2. Description of the Prior Art

In the automotive technologies, it is general or typical strategy for controlling various automotive installations, such as an internal combustion engine, a power train, a suspension system, a brake system and so forth, on the basis of a predetermined control constant in order to maintain vehicular driving parameters close to or at predetermined target values. As a result, control characteristics in various control are fixed at preset characteristics. For example, in the case of the internal combustion engine, a transition characteristic is fixed and determined by preset transition characteristics in an engine control system. Also, in the case of a transmission shift timing control, shift-up and shift-down timing for varying the transmission speed ratio is fixedly determined according to preset shifting characteristics associated with preselected transmission control parameters.

One of the typical types of shift control for the automotive automatic power transmission has been disclosed in Japanese Utility Model First (unexamined) Publication (Tokkai) Showa 62-194231. In the disclosure, a shift control system sets a shift pattern map in terms of preselected shift control parameters, such as an engine revolution speed, a throttle angular position and so forth. The shift control system thus selects transmission speed ratio on the basis of the shift control parameters according to the shift control characteristics set in the shift pattern map.

Such vehicular control systems encounter the drawback in optimizing control characteristics. Some examples will be listed herebelow.

When engine revolution asynchronous fuel supply, such is performed for various reason, such as for an acceleration enrichment for better engine response, engine jerking tends to occur under heavy traffic. On the other hand, when the transmission shift pattern is set principally for achieving good fuel economy, shift-up points at respective transmission speed ratio are set to cause up-shifting of the transmission speed ratio at unacceptably low engine speed to cause difficulty in sporty driving. Furthermore, by setting the transmission speed ratio for fuel economy, the transmission speed ratio shift-up and shift down operation is repeated frequently in heavy traffic to degrade drivability and riding comfort of the vehicle.

In contrast, it is natural demand of the drivers to adapt various control characteristics to be adapted to the vehicle or engine driving conditions. For instance, the driver tends to demand economical shift pattern in town road, powerful shift pattern in sporty driving, and a shift pattern having less occurrence of shifting in heavy traffic. In view of these, it is preferred to vary the transmission speed ratio shifting pattern depending upon vehicle driving condition and environmental conditions of the vehicle. For achieving this, it becomes essential to accurately detect the vehicle driving and environmental conditions for obtaining optimal control characteristics.

SUMMARY OF THE INVENTION

Therefore, it is an object of the present invention to provide a system for recognizing vehicle driving condition and environmental condition for performing control of vehicular drive.

Another object of the invention is to provide a shift control system for an automotive automatic power transmission for selecting a transmission speed ratio shifting pattern depending upon a recognized vehicle driving condition and/or environmental condition.

In order to accomplish the aforementioned and other objects, a driving condition recognition system, according to the present invention, includes data sampling means, respectively monitoring a plurality of preselected parameters associated with vehicular driving, such as a throttle valve open angle, and engine speed and so forth, for sampling vehicular drive condition associated parameter data within every predetermined period of time. The system also includes means for deriving vehicle condition evaluating data on the basis of all of the sampled parameter data with respect to each of the parameters to be monitored. The system further includes means for evaluating respective driving mode evaluating functions set with respect to each parameter, for determining a satisfying degree relative to the relevant evaluating function. The system further includes means for recognizing a vehicle driving condition on the basis of the satisfying degree of respective parameters.

According to one aspect of the invention, a system for recognizing driving condition of an automotive vehicle, comprises first means for monitoring a plurality of preselected parameters reflecting a vehicle driving condition and sampling parameter data of respective parameters with a given intervals; second means for processing sampled parameter data of each parameter for deriving a parameter associated evaluation data of the corresponding parameter; third means utilizing a plurality of evaluating functions respectively set with respect to the corresponding parameter, for deriving distribution of said parameter associated evaluation data over a plurality of predetermined value ranges respectively corresponding to a plurality of vehicular driving modes to produce a distribution indicative data; and fourth means for processing the distribution indicative data of all parameters for deriving a vehicle driving condition indicative data.

Preferably, the second means utilizes a plurality of preset parameter evaluating functions for deriving distribution of said parameter data over a plurality of predetermined value ranges respectively corresponding to a vehicular driving mode. Also, the first means may monitor at least a first parameter reflecting an engine load condition and a second parameter reflecting an engine speed. The evaluating function may have a first value range of said parameter associated evaluation data, in which the function value is maintained constant at a predetermined maximum value and a second value range overlapping with another evaluating function, in which function value varies between said predetermined maximum value and a predetermined minimum value. In such case, the third means may derive said function value with respect to each of said vehicular driving modes, which function value represents distribution of said parameter associated evaluation data over said vehicular driving modes. The third means preferably integrates said function values derived with respect to each of individual parameter data for deriving a distribution indicative data of each of said driving modes. In the further preferred embodiment, the fourth means is provided weighting factors for each driving modes and derives said vehicular driving condition indicative data on the basis of said distribution indicative data and said weighting factors. The fourth means may perform a weighting averaging operation of said distribution indicative data with said weighting factor for deriving said vehicular driving condition indicative data.

On the other hand, the parameter evaluating function may have a first value range of said parameter associated evaluation data, in which the function value is maintained constant at a predetermined maximum value and a second value range overlapping with another evaluating function, in which the function value varies between said predetermined maximum value and a predetermined minimum value. In such case, the second means may derive said function value with respect to each of said vehicular driving modes, which function value represents distribution of said parameter associated evaluation data over said vehicular driving modes.

According to another aspect of the invention, a system for controlling shifting of an automotive automatic power transmission comprises vehicle speed sensor for monitoring a vehicle speed for producing a vehicle speed data; a throttle angle sensor for monitoring a throttle valve angular position for producing a throttle angle data; a shift pattern selected means for selecting one of a plurality of transmission speed ratio shifting patterns respectively adapted to vehicular driving modes, said shift pattern selection means being associated with the driving condition recognizing means includes first means for monitoring a plurality of preselected parameters reflecting a vehicle driving condition and sampling parameter data of respective parameters with a given intervals; second means for processing sampled parameter data of each parameter for deriving a parameter associated evaluation data of the corresponding parameter; third means utilizing a plurality of evaluating functions respectively set with respect to the corresponding parameter, for deriving distribution of said parameter associated evaluation data over a plurality of predetermined value ranges respectively corresponding to a plurality of vehicular driving modes to produce a distribution indicative data; and fourth means for processing the distribution indicative data of all parameters for deriving a vehicle driving condition indicative data; and a shift control means for deriving a transmission speed ratio on the basis of said vehicle speed data and said throttle angle data according to selected one of the shift patterns.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but is for explanation and understanding only.

In the drawings.

DESCRIPTION OF THE PREFERRED EMBODIMENT

Figure 1:
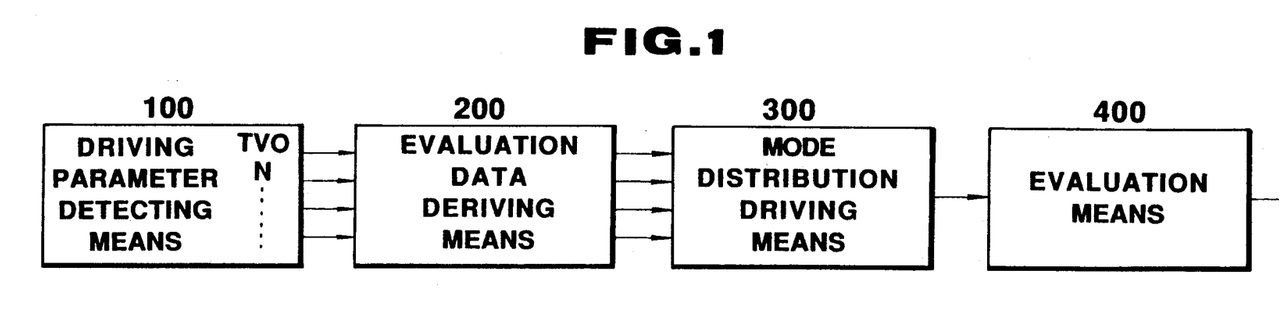
FIG. 1 is a block diagram of a driving condition recognition system, generally illustrating the principle construction of the present invention.

Referring now to the drawings, FIG. 1 is illustrated in a discrete manner for showing general concept of a vehicle driving condition recognition system according to the present invention. In general, the shown recognition system monitors a variety of vehicle driving parameters which reflect vehicle driving condition. The system derives data for evaluation on the basis of the monitored data with respect to each of the parameters. Combination of the evaluating data with respect to a plurality of parameters is compared with a preset combinations of data values of the corresponding parameters which are set with respect to a plurality of vehicle driving modes. The vehicle driving mode which has the closest combination, will then be selected as the recognized vehicle driving mode.

In FIG. 1, the driving condition recognition system, according to the present invention includes driving parameter detecting means 100 which monitors preselected parameters reflecting vehicular driving conditions. In the shown embodiment, a throttle value angular position TVO, an engine revolution speed N, a vehicle speed VSP and so forth are utilized as parameters for detecting the vehicle driving mode. For monitoring these parameters, at least a throttle angle sensor, an engine speed sensor, a vehicle speed sensor and so forth are employed in the driving parameter detecting means. The parameter detecting means 100 samples data values of respective parameters at given intervals so as to generate unit time parameter data.

The driving condition recognition system also includes an evaluation data deriving means 200. The evaluation data deriving means 200 reads out the accumulated unit time parameter data for deriving an evaluation data on the basis thereof, with respect to each of the monitored parameters. Derivation of the evaluation data on the basis of the accumulated unit time parameter data can be done in various ways. In the preferred process, the evaluation data deriving data classifys each individual unit time parameter data with respect to preset classification criteria. For example, in the shown embodiment, each individual unit time parameter data is classified into a large value range, an intermediate value range and a small value range. Then, the frequency of occurrence of each of the large, intermediate and small value ranges is checked for deriving the evaluation data. Therefore, the evaluation data is weighted by occurrence of each range of values.

The evaluation data thus derived is transferred to a mode distribution deriving means 300. The mode distribution deriving means 300 compares the evaluation data with respect to each parameter with a plurality of mode selection criteria set with respect to each parameter, to derive distribution or proportion of the evaluation data over a plurality of mode value ranges. For example, in the shown embodiment, the mode value ranges are set with respect to each parameter and to represent four vehicular driving mode, e.g. heavy traffic mode, town road mode, high speed cruise mode and sporty mode. Therefore, evaluation value with respect to each parameter is classified into one of the mode value ranges. An evaluation means 400 then performs recognition of vehicular driving mode on the basis of the distribution of evaluation values of respective parameters in the mode value ranges.

The recognized vehicular driving mode can be utilized in various control operations in the automotive vehicle. For example, such recognized vehicular modes can be taken for selecting one of transmission shifting patterns respectively adapted to vehicular driving modes.

Figure 2:
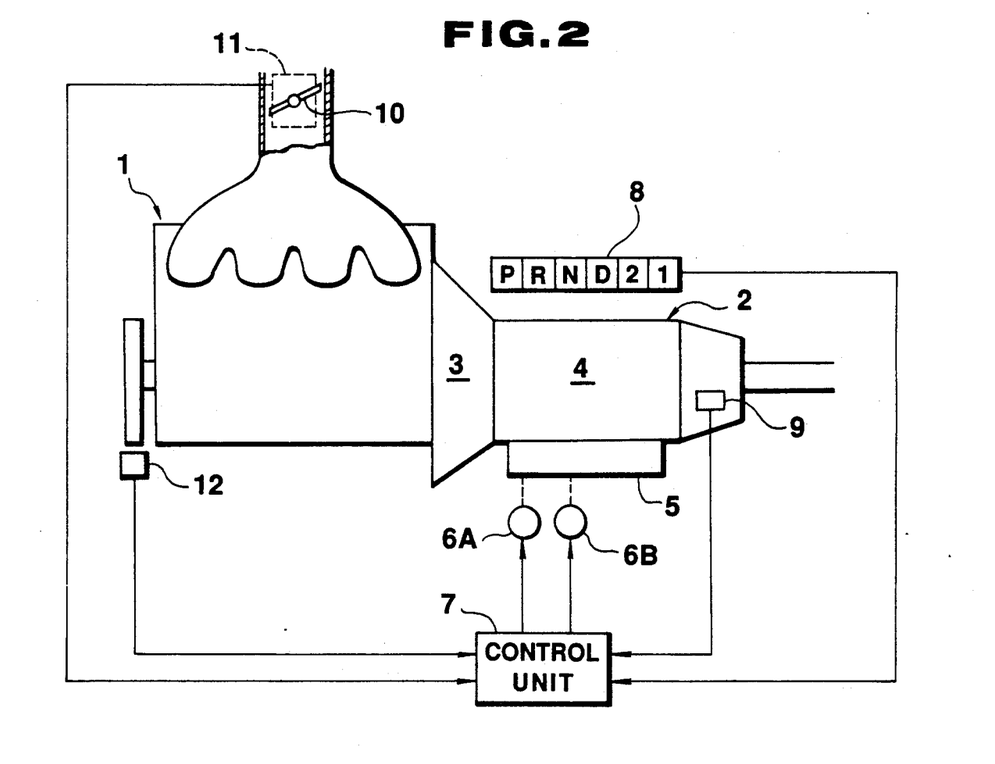
FIG. 2 is a schematic block diagram of the preferred embodiment of a shift control system for an automotive automatic power transmission, which selects one of a plurality of shift patterns according to the recognized vehicle driving condition.
Figure 3:
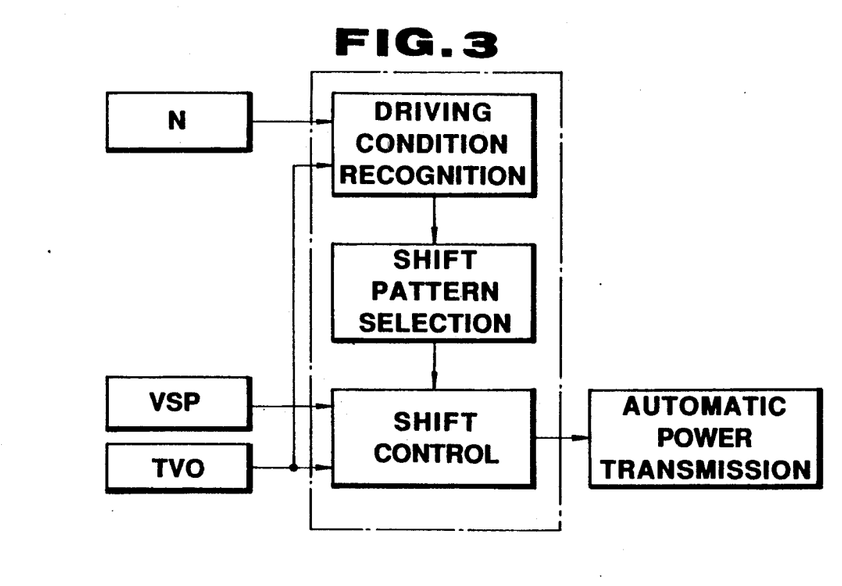
FIG. 3 is a block diagram of the preferred embodiment of the shift control system of FIG. 2.

FIG. 2 shows general construction of a shift control system for an automatic power transmission for which the driving condition recognition system set forth above is applicable. Detailed discussion about the driving condition recognition system will be discussed herebelow in terms of application for the automatic power transmission shift control. As will be naturally appreciated, on automotive internal combustion engine 1 is associated with an automatic power transmission 2 which includes a torque converter 3 and transmission gear assembly 4. A hydraulic actuator 5 is associated for supplying line pressure for the transmission gear assembly through a selected route for establishing a selected one of a plurality of power transmission route and thereby establishing a desired transmission speed ratio. For selectively establishing the route of the supply of line pressure, electromagnetic valves 6A and 6B are provided. Number of the the electromagnetic valves is not specified to two but can be any appropriate number. For instance, as is well known, shift valves, timing valves and so forth are employed in the hydraulic circuit of the automatic power transmission for selectively establishing various speed ratios. It should be appreciated that the shown electromagnetic valves are just examples showing presence of valves for performing shift operations. In the shown embodiment, the automatic power transmission is operatable in P (parking) range, R (reverse) range, N (neutral) range, D (automatic shifting) range, 2 (second speed ratio hold) range and 1 (first speed ratio hold) range. These operational ranges of the automatic power transmission is selected in manual through a manually operable selector.

The electromagnetic valves 6A and 6B control the valve position via a control unit 7 which can comprise a microprocessor. For performing shift control operations, the control unit 7 is connected to a throttle angle sensor 11 which monitors angular position of a throttle valve 10 disposed within an air indication system of the engine. A crank angle sensor 12 monitors angular position of a crankshaft of the engine to produce an engine revolution synchronous frequency signal, such as a crank reference signal produced at every predetermined angular position of the crankshaft and crank position signal produced at every predetermined angle of angular displacement of the crankshaft. The control unit 7 receives the engine revolution synchronous frequency signal to derive an engine speed data N. The control unit 7 further receives a selector position indicative signal from a selector position sensor 8. In addition, a vehicle speed sensor 9 is further connected to the control unit 7 for providing a vehicle speed data.

Based on the parameter data input, the control unit 7 performs a shift control operation. As well, the control unit is provided a capability of recognizing driving condition of the vehicle on the basis of the input parameter data. In order to perform both the shift control operation and the vehicular driving condition recognition, the control unit 7 as illustrated in discrete form, has a vehicle driving condition recognition stage 72, a transmission shift pattern selection stage 74 and a shift control stage 76, though these stages are formulated in the software in practice. The vehicular driving condition recognizing stage is generally established by various means discussed with respect to FIG. 1. The shift pattern selecting stage 74 is set to a plurality of shift patterns respectively adapted to vehicle driving modes, e.g. heavy traffic mode, town road mode, high speed cruising mode, sporty mode and so forth. In practice, a shift pattern is constituted of a plurality of shift lines set in terms of the throttle valve open angle and the vehicle speed. Such shift lines are shifted depending upon the vehicular driving modes for establishing variety of shift patterns.

Here, the relationship between the vehicular driving modes and various parameters will be discussed with reference to FIG. 4. As can be seen from FIG. 4, in substantially heavy traffic, the start and stop of the vehicle is repeated and vehicle speed is maintained at substantially low speed. Therefore, the throttle valve open angle TVO is held substantially small. Furthermore, since such slow traveling speed does not require swift depression of the accelerator pedal, the variation rate of the throttle valve open angle $\Delta TVO/\Delta t$ ($\Delta t$: unit time) is held small. Because of substantially small open angle of the throttle valve, the engine speed N is held low and the engine speed variation rate $\Delta N/\Delta t$ is also maintained low. As a result, the vehicle speed VSP is held substantially low and variation rate thereof $\Delta VSP$ is held small. At this driving mode, the transmission speed ratio is held at lower speed ratio. On the other hand, in the heavy traffic, since starting and stopping is repeated, the frequency of occurrence of shifting of the speed ratio, or shift frequency neither low nor high, but medium. Therefore, when all of the conditions set forth above is satisfied, judgement can be made that the vehicular driving mode is heavy traffic mode.

In the town road, the vehicle is driven at medium speed. For this, the throttle valve open angle TVO is held medium. At this time, since the vehicle is decelerated at corner or intersection of the road and stopped at stop signal, variation rate $\Delta TVO$ of throttle valve open angle is also medium. Also, the engine speed N is maintained low or medium for traveling through the town. Since swift acceleration and deceleration will not be required, the variation rate $\Delta N/\Delta t$ of the engine speed is also medium. In the town road, the transmission speed ratio is held at medium speed ratio, e.g. second or third speed ratio and shifting occurrence is also medium. If such condition is satisfied, judgement can be made that the vehicle is driven in the town road mode. At high speed cruising, the throttle valve open angle TVO is held medium and the variation rate $\Delta TVO/\Delta t$ of the throttle valve open angle is held substantially small because the accelerator pedal stays at the depressed condition. For high speed cruising, high speed ratio, e.g. over-drive speed ratio or fourth speed ratio may be selected for riding comfort, fuel economy and for other various reason. Therefore, the engine speed N is maintained medium. The variation rate $\Delta N/\Delta t$ of the engine speed is also maintained medium. The vehicle speed VSP is maintained high. The variation rate of the vehicle speed $\Delta VSP/\Delta t$ is held medium. At high speed cruising, the vehicle speed will not be changed significantly frequency of shifting of the transmission speed ratio is therefore low.

On the other hand, in sports driving, the accelerator pedal is depressed at significant magnitude for good acceleration. Therefore, throttle valve open angle TVO is held large. Furthermore, sports driving may leads swift depression and release of the accelerator pedal, variation ratio $\Delta TVO/\Delta t$ if the throttle valve is large. At this mode, the engine speed N is preferred to be maintained at medium or high for better acceleration characteristics of the vehicle and variation ratio $\Delta N/\Delta t$ is large due to large variation rate $\Delta TVO/\Delta t$ of the throttle valve open angle. The vehicle speed $\Delta SP$ is held medium for frequent cornering and variation rate $\Delta SP/\Delta t$ is maintained large. The transmission speed ratio is selected in low and medium speed ratios with high frequency of shifting.

Figure 4:
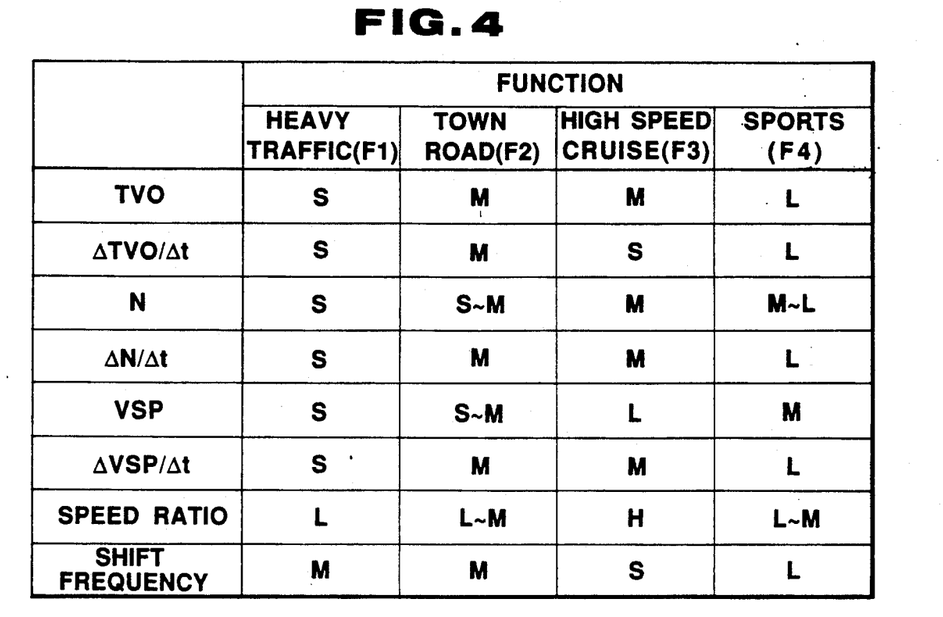
FIG. 4 is an explanatory illustration of a table showing variety of combinations of parameter data values relative to a plurality of vehicular traveling modes.

As can be seen from FIG. 4, combinations of parameter data in respective vehicular driving modes are mutually distinct to each other. Therefore, by checking the combination of the parameter data, the vehicle driving condition can be recognized. According to the present invention, recognition of the vehicle driving condition is performed according to the process as illustrated in FIG. 5.

Figure 5:
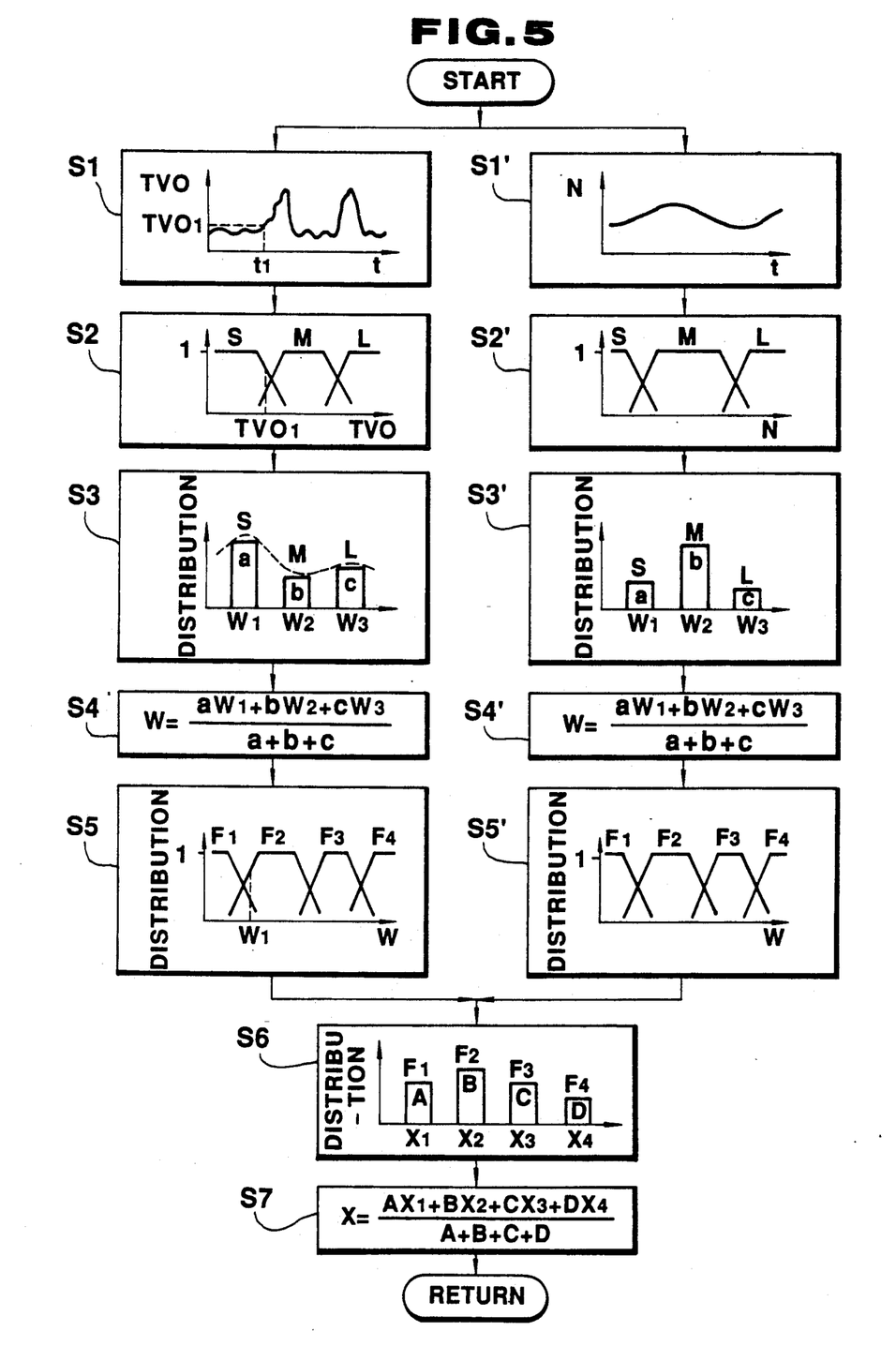
FIG. 5 is a flowchart showing process of recognition of the vehicle driving condition.

In FIG. 5, the branches formed by steps $S_1$ through $S_5$ and $S_1'$ through $S_5'$ are independent of each other and can be performed in series of processes or as separate processes to each other. Therefore, the flowchart illustrated in FIG. 5 should be appreciated as that for explanation. As can be seen, the process in the steps $S_1$ through $S_5$ is constituted for deriving evaluation data with respect to a throttle valve open angle TVO. On the other hand, the process in the steps $S_1'$ through $S_5'$ is constituted for deriving evaluation data with respect to the engine speed N.

At step $S_1$, the throttle valve open angle data TVO from the throttle angle sensor is sampled for forming the unit time throttle angle data. At the step $S_2$, evaluation for each of the unit time throttle angle data TVO is performed. In the shown embodiment, evaluation of the unit time throttle angle data is performed by utilizing a plurality of evaluating functions. The shown embodiment employs three functions respectively set as shown. Practically, the functions has flat portion at throttle valve open angle range where the value range of the throttle valve open angle data value do not overlap with other value ranges. In such range, the value of the function is set to one (1). On the other hand, at transition portion where the value ranges overlap to each other, the value of the function varies linearly between a predetermined minimum value and a maximum value (1). The value of the function is read in terms of each of the unit time throttle angle data TVO.

For example, assuming the throttle angle data at a time $t_1$ is $TVO_1$ as illustrated in the block of the step S1, the corresponding values of the functions are derived utilizing the evaluating functions. As can be seen, since the throttle angle data $TVO_1$ is in the transition portion between the small value range and medium value range, small value range function value and the medium range function value are derived with respect to the throttle angle data $TVO_1$. On the other hand, since the throttle angle data $TVO_1$ is out of the value range of the large value range, the large value range function value becomes zero. In the shown case, the small value range function value may be 0.7 and the medium value range function value may be 0.3.

Respective function values derived in terms of each of the unit time throttle angle data TVO, is then integrated at the step $S_3$ to form distribution of occurrence of the respective value range function values. At the step, distribution indicative values a, b and c are thus established depending upon the frequency of occurrence of the function values in respective value ranges. Based on the distribution indicative values a, b and c, a throttle angle associated evaluation value W is arithmetically derived at the step $S_4$. In practice, weighting strategy is introduced in the process of the step $S_4$ by providing respective weighting values $w_1$, $w_2$ and $w_3$ for respective small value range, medium value range and large value range. For example, respective weighting values $w_1$, $w_2$ and $w_3$ are set at 0.25, 0.50 and 0.75 to give greater weight for the large value range. In the step $S_4$, a weighting average is derived by the following equation:

$$W = (aw_1 + bw_2 + cw_3)/(a+b+c)$$

It should be appreciated that the process for deriving the evaluation value is not specified to the shown process but can be replaced with any other processes which can derive the evaluation value with satisfactory precision. For example, the evaluation value can be derived by determining the center value of the area defined by an envelope as shown by broken line in the block of the step $S_3$.

At the step $S_5$, the throttle angle associated evaluation data W is evaluated driving mode associated evaluating functions. In the shown embodiment, the driving mode associated evaluating functions are set for heavy traffic mode, town road mode, high speed cruising mode and sporty mode. Similarly to the foregoing evaluating functions for evaluating the throttle angle data TVO, respective driving mode associated evaluating functions has a portion where the function value is constant at one (1) and where is not overlapped with other functions, and transition portion where the functions are overlapping. Evaluation for the throttle angle associated evaluation data is performed utilizing the driving mode associated evaluating functions for deriving driving mode associated evaluation data.

Practically, if the throttle angle associated evaluation data has a value $W_1$ as shown in the block of the step S5, the value $W_1$ resides in the transition portion between the heavy traffic mode and the town road mode. Therefore, respective function values are read out on the evaluating functions set for the heavy traffic mode and the town road mode. In the shown case, the evaluation data of the heavy traffic mode may be 0.3 and the evaluation data of the town road mode is 0.7. At this time, since the evaluating function for high speed cruising mode and sporty mode have no portion corresponding to the evaluation value $W_1$, the function values for these modes becomes zero (0).

A similar process is performed through the steps $S_1'$, to $S_5'$, for processing the engine speed data N. Therefore, the engine speed associated evaluation data is derived with respect to each of the driving modes utilizing the evaluating functions as illustrated in the block of the step $S_2'$ and the driving mode associated evaluation data is derived on the basis of the engine speed associated evaluation data utilizing the evaluating function as illustrated in the block of the step $S_5'$.

At a step $S_6$, respective driving mode associated evaluation data of respective parameters derived with respect to each driving mode are integrated to derive distribution indicative data A, B, C and D, each of which represent frequency or inclination of the driving mode of the vehicle. For respective driving modes, weighting values $x_1$, $x_2$, $x_3$ and $x_4$ are provided for giving weighting for respective driving modes. In the shown embodiment, the weighting values $x_1$, $x_2$, $x_3$ and $x_4$ are respectively set at 0.2, 0.4, 0.6 and 0.8) for providing greater weight for the sporty mode. Then, on the basis of the distribution indicative data A, B, C and D, a driving condition indicative data X is arithmetically derived at a step $S_7$. In practice, the the driving condition indicative data X is calculated by deriving a weighting average as expressed by the following equation:

$$X = (Ax_1 + Bx_2 Cx_3 + Dx_4)/(A + B + C + D)$$

The driving condition indicative data X is compared with driving mode criteria respective set for defining value ranges of the driving condition indicative data value in the heavy traffic mode, the town road mode, the high speed cruising mode and sporty mode, the vehicle driving mode can be recognized.

Similarly to the foregoing, the driving condition indicative data X can be derived in different way. For example, by determining the center of the area defined by the envelop extending the peak of the bars in the block of the step $S_6$, the driving condition indicative data X can be derived.

Figure 6:
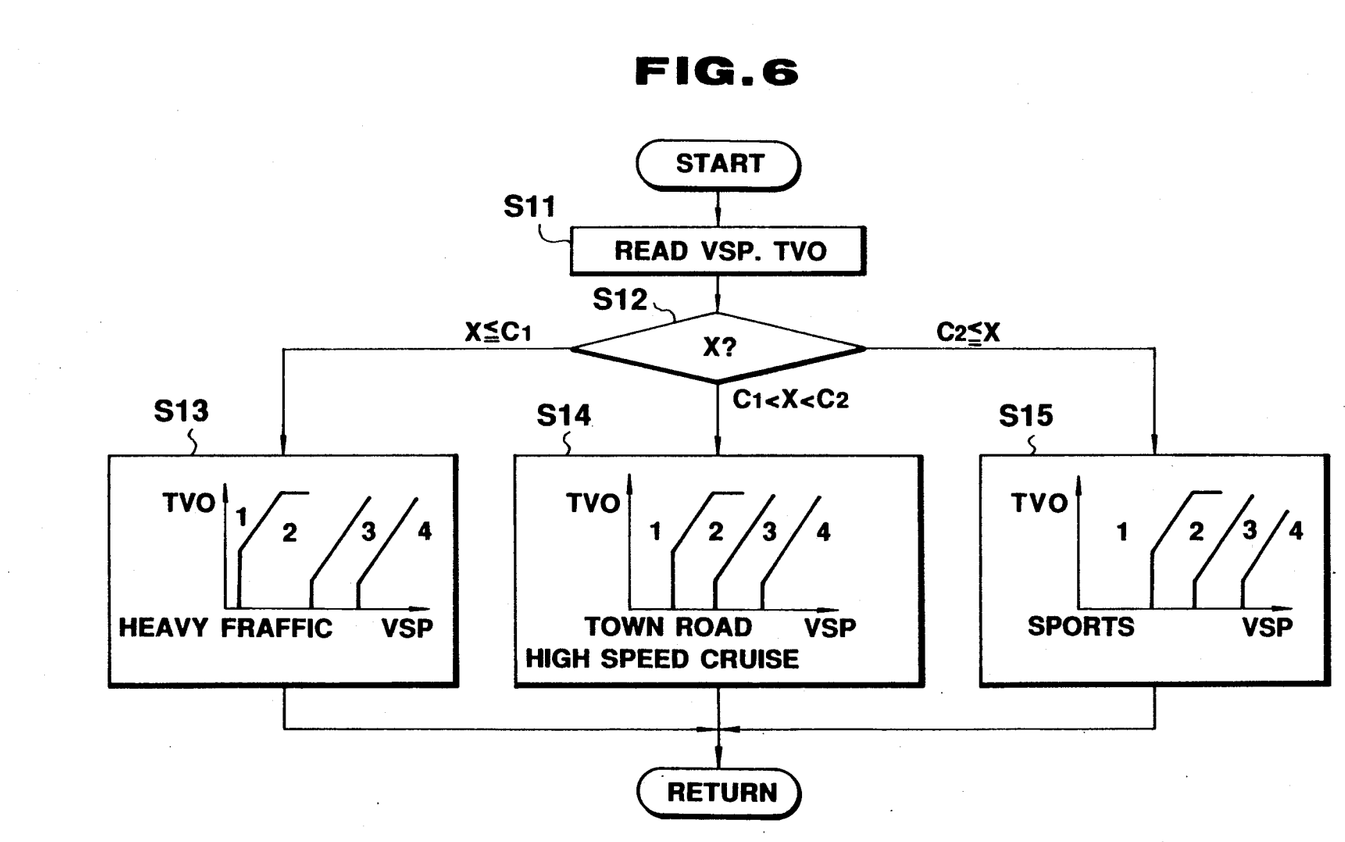
FIG. 6 is a flowchart showing process of selecting shift pattern in transmission speed ratio shift control.

Utilizing recognized vehicle driving condition, shift pattern selection for shift control of the automatic power transmission is performed through steps $S_{11}$ to $S_{15}$.

At a step $S_{11}$, the vehicle speed data VSP and the throttle angle data TVO are read out. Then, the driving condition indicative data X is read out and compared with the driving mode criteria $C_1$, $C_2$ and $C_3$ at a step $S_{12}$. If the driving condition indicative data X is smaller than or equal to $C_1$, a shift pattern adapted for heavy traffic mode is selected at a step $S_{13}$. On the other hand, when the driving condition indicative data X is greater than $C_1$ and smaller than $C_2$, then a shift pattern adapted for town road mode and high speed cruising mode is selected at a step $S_{14}$. Though the shown embodiment utilizing the same shift pattern for town road mode and high speed cruising mode, it may be possible to use the separate shift pattern. When the driving condition indicative data X is greater than or equal to $C_2$, then the sporty mode is selected at a step $S_{15}$.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Though the shown embodiment utilizes the driving condition indicative data X derived through the process set forth above, it may be possible to use equivalent but different value for detecting the vehicle driving condition. For instance, in order to detect, a value (a/-(a+b+c)) can be used. In such case, the value may be compared with criterion adapted for making judgement of the heavy traffic and normal traffic, which is different from that of the values used in the shown embodiment will be used.

What is claimed is:

1. A system for controlling shifting of an automotive automatic power transmission comprising:
    a vehicle speed sensor for monitoring a vehicle speed for producing a vehicle speed data;
    a throttle angle sensor for monitoring a throttle valve angular position for producing a throttle angle data;
    a shift pattern selection means for selecting one of a plurality of transmission speed ratio shifting pattern respectively adapted to vehicular driving modes, said shift pattern selection means being associated with a driving condition recognizing means which includes:
        first means for monitoring a plurality of preselected parameters reflecting a vehicle driving condition and sampling parameter data of respective parameters with a given intervals;
        second means for processing sampled parameter data of each parameter for deriving a parameter associated evaluation data of the corresponding parameter;
        third means utilizing a plurality of evaluating functions respectively set with respect to the corresponding parameter, for deriving distribution of said parameter associated evaluation data over a plurality of predetermined value ranges respectively corresponding a plurality of vehicular driving modes to produce a distribution indicative data; and
        fourth means for processing the distribution indicative data of all parameters for deriving a vehicle driving condition indicative data; and
    a shift control means for deriving a transmission speed ratio on the basis of said vehicle speed data and said throttle angle data according to selected one of the shift patterns.

2. A system as set forth in claim 1, wherein said second means utilizes a plurality of preset parameter evaluating functions for deriving distribution of said parameter data over a plurality of predetermined value ranges respectively corresponding to a vehicular driving modes.

3. A system as set forth in claim 1, wherein said first means monitors at least a first parameter reflecting an engine load condition and a second parameter reflecting an engine speed.

4. A system as set forth in claim 1, wherein said evaluating function has a first value range of said parameter associated evaluation data, in which the function value is maintained constant at a predetermined maximum value and a second value range overlapping with another evaluating function, in which function value varies between said predetermined maximum value and a predetermined minimum value.

5. A system as set forth in claim 4, wherein said third means derives said function value with respect to each of said vehicular driving modes, which function value represents distribution of said parameter associated evaluation data over said vehicular driving modes.

6. A system as set forth in claim 5, wherein said third means integrates said function values derived with respect to each of individual parameter data for deriving a distribution indicative data of each of said driving modes.

7. A system as set forth in claim 6, wherein said fourth means is provided weighting factors for each driving modes and derives said vehicular driving condition indicative data on the basis of said distribution indicative data and said weighting factors.

8. A system as set forth in claim 7, wherein said fourth means performs weighting averaging operation of said distribution indicative data with said weighting factor for deriving said vehicular driving condition indicative data.

9. A system as set forth in claim 2, wherein said parameter evaluating function has a first value range of said parameter associated evaluation data, in which the function value is maintained constant at a predetermined maximum value and a second value range overlapping with another evaluating function, in which function value varies between said predetermined maximum value and a predetermined minimum value.

10. A system as set forth in claim 9, wherein said second means derives said function value with respect to each of said vehicular driving modes, which function value represents distribution of said parameter associated evaluation data over said vehicular driving modes.

11. A system for recognizing driving condition of an automotive vehicle, comprising:
  a) first means for detecting a plurality of vehicle driving condition parameters, the vehicle driving condition parameters including at least an opening angle of a throttle valve of a vehicular engine and engine revolutional speed;
  b) second means for sampling the vehicle driving condition parameters for each unit time interval to derive time series data of the respective vehicle driving condition parameters;
  c) third means for preparing a representative data from the time series data of each vehicle driving condition parameter;
  d) fourth means for providing driving mode evaluation functions based on respective predetermined vehicle driving condition parameters existing during predetermined vehicle driving conditions and, for calculating using the driving mode evaluation functions, a magnitude of satisfaction for each of the driving mode evaluation functions on the basis of the respective representative data of the plurality of vehicle driving condition parameters;
  e) fifth means for determining the present vehicle driving condition according to the calculation result of the magnitude of satisfaction from the respective driving mode evaluation functions, and for generating a signal indicative thereof; and
  f) sixth means for receiving said signal from said fifth means and for altering an operating state of said automotive vehicle.

12. A system as set forth in claim 11, wherein said second means utilizes a plurality of preset parameter evaluating functions for deriving distribution of said parameter data over a plurality of predetermined value ranges respectively corresponding to a vehicular driving mode.

13. A system as set forth in claim 11, wherein said first means detects at least a first driving condition parameter reflecting an engine load condition and a second driving condition parameter reflecting an engine speed.

14. A system as set forth in claim 11, wherein said driving mode evaluating function has a first value range of data, in which the function value is maintained constant at a predetermined maximum value and a second value range overlapping with another driving mode evaluation function, in which the function value varies between said predetermined maximum value and a predetermined minimum value.

15. A system as set forth in claim 14, wherein said third means derives said function value with respect to each of said vehicular driving modes, which function value represents distribution of said time series data over said vehicular driving modes.

16. A system as set forth in claim 15, wherein said third means integrates said function values derived with respect to each of said drive condition parameter data for preparing representative data from the time series data of each vehicle driving condition parameter.

17. A system as set forth in claim 16, wherein said third means is provided weighting factors for each driving mode and derives said representative data based on said time series data and said weighting factors.

18. A system as set forth in claim 17, wherein said third means performs a weighting averaging operation of said time series data with said weighting factors for deriving said representative data.

19. A system as set forth in claim 12, wherein said parameter evaluating function has a first value range of said parameter associated evaluation data, in which the function value is maintained constant at a predetermined maximum value and a second value range overlapping with another evaluating function, in which function value varies between said predetermined maximum value and a predetermined minimum value.

20. A system as set forth in claim 19, wherein said second means derives said parameter evaluating function value with respect to each of said vehicular driving modes, which function value represents distribution of said parameter associated evaluation data over said vehicular driving modes.

21. A system as claimed in claim 11, wherein said operating state comprises a driving shift position of an automatic transmission.

* * * * *